United States Patent [19]

Clayton et al.

[11] Patent Number: 5,101,424
[45] Date of Patent: Mar. 31, 1992

[54] METHOD FOR GENERATING A MONITOR PROGRAM FOR MONITORING TEXT STREAMS AND EXECUTING ACTIONS WHEN PRE-DEFINED PATTERNS, ARE MATCHED USING AN ENGLISH TO AWK LANGUAGE TRANSLATOR

[75] Inventors: John W. Clayton; Steven B. Lucovsky, both of Cary, N.C.

[73] Assignee: Northern Telecom Limited, Montreal, Canada

[21] Appl. No.: 589,271

[22] Filed: Sep. 28, 1990

[51] Int. Cl.⁵ .......................................... H04M 3/28
[52] U.S. Cl. ...................................... 379/10; 379/15; 379/32
[58] Field of Search .................. 379/9, 10, 15, 16, 17, 379/32

[56] References Cited

U.S. PATENT DOCUMENTS

4,782,506 11/1988 Sevcik .................................. 379/10

Primary Examiner—Stafford D. Schreyer
Attorney, Agent, or Firm—Foley & Lardner

[57] ABSTRACT

The disclosure is a technique to automatically generate AWK code from English text for monitoring text streams and executing actions when predefined patterns are matched. The English to AWK Translator in ITM can translate English keywords and data into executable AWK programs. Since text steams from a modem port can be monitored the same way as a file, it is possible to monitor telephone switches with the AWK programs generated by the Translator. With an automated monitor system like the Ineractive Text Monitor, telephony engineers will free themselves of expensive and boring babysitting sessions when they monitor switches looking for problems to occur.

6 Claims, 2 Drawing Sheets

METHOD FOR GENERATING A MONITOR PROGRAM FOR MONITORING TEXT STREAMS AND EXECUTING ACTIONS WHEN PRE-DEFINED PATTERNS, ARE MATCHED USING AN ENGLISH TO AWK LANGUAGE TRANSLATOR

BACKGROUND OF THE INVENTION

Digital telephone switches (DMSs, 1As, etc.) commonly experience software and hardware problems that occur intermittently. To solve these problems, it is often necessary for an engineer, with the aid of a computer, to dial into a central office and monitor log reports produced by the switch and respond with appropriate actions when a problem is identified. A log is a status/information report to notify the user of events, software or hardware failures, or limitations of the switch. If the problem occurs infrequently (every few days or weeks), it is expensive and boring for an engineer to watch log reports for the error to occur. One way to free up the engineer's time is to make use of the UNIX-based AWK programming language to scan the text streams being sent from the telephone switch and automatically respond with actions when a pre-defined search pattern is found.

AWK is a text processing language that is generally used to scan specific text, and perform some function when a text match is found. AWK can also be used to scan text streams coming from a modem port and react when a pre-defined pattern is matched with the text stream by sending data or commands through the modem to the telephone switch. Telephony engineers will often execute commands at the remote telephone switch or collect data in files when debugging a problem. AWK is a powerful text processing language in the UNIX system that complements the engineer's needs, but like all programming languages, it must be learned, and when a program is written, it must be debugged. Unfortunately, few telephony engineers are experts in the use of UNIX and even fewer know AWK; those that do must write and debug the program, a process taking up to several days for difficult search and action requirements.

SUMMARY OF THE INVENTION

In view of the foregoing, it is an object of the invention to provide telephony engineers with a means of monitoring telephone switches by creating AWK programs.

It is a further object of the invention to provide the engineer with a means for defining complex pattern definitions and multiple actions that can be executed at the start-up of a monitor session, when a pattern is matched, or every x seconds.

It is a further object of the invention to provide the engineer with a simple way to activate/deactivate monitor sessions and receive on-line help.

It is a further object of the invention to allow the engineer to define patterns and actions in an English format and to convert the user input into an AWK program automatically.

The above objects of the invention are accomplished by a system package called the Interactive Text Monitor (ITM).

According to an aspect of the invention there is provided a method of creating a monitor program for monitoring text streams contained in log reports produced by a telephone switch, comprising the steps of:

a) creating a pattern definition by selecting text strings with individual character patterns required to be matched with corresponding character patterns in search strings received from said telephone switch;

b) selecting action definitions and corresponding action keywords such that a selected action is executed when a pattern definition is matched;

c) storing said matched pattern and action definitions in a session file; and d) generating a monitor program by:
   i) reading said session file line-by-line;
   ii) selecting a conversion routine to be executed to create an AWK code according to said keywords located in said session file;
   iii) converting unselected characters in said pattern definition to UNIX metacharacters; and
   iv) creating, as an output, a monitor program in AWK code.

DESCRIPTION OF THE PREFERRED EMBODIMENT

Figure 1:
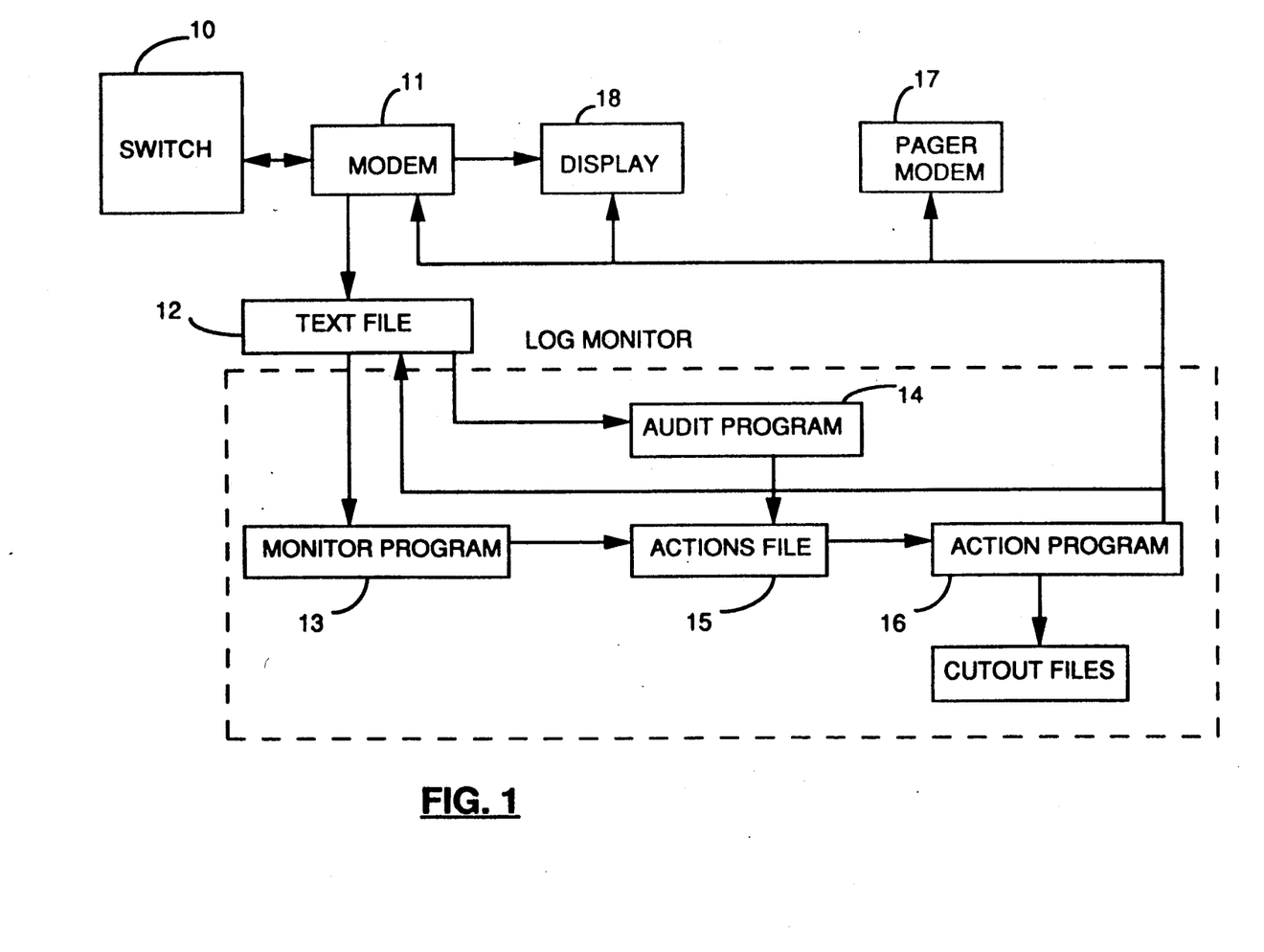
FIG. 1 is a block diagram describing graphically the process of monitoring a telephone switch.

FIG. 1 shows a graphical representation of the process of monitoring log reports generated by a switch 10. Briefly, the text strings from the switch are received through an 710 device, such as modem 11 and can be stored in a text file 12. The AWK monitor program 13 and audit program 14 read the strings from the modem 11 or the text file 12 and, when a match in the strings is found, the monitor and audit programs send action commands into an action file 15. An action program 16 reads the action requests from the action file 15 and performs the correct actions. An action request can for example, consist of the dialing of a pager via a modem 17, sending a message to a display terminal 18, or executing a command on switch 10 via modem 11.

Prior to monitoring actual log reports generated by a switch, a user must first create a monitor session. A monitor session consists of start-up actions, patterns to scan, and actions to perform when an associated pattern is matched. Using the Interactive Text Monitor (ITM) of the present invention to create a monitor session, a user may easily define simple or complex patterns. A pattern may range from a single token (a set of alphanumeric characters separated by white spaces) to many lines, each with a varying number of tokens. These patterns may be nested within other patterns (when the first pattern is matched during an active ITM monitor session, the nested pattern is next searched for) or categorized as independent entities. ITM allows the user to define patterns using UNIX metacharacters and ITM variables (ITM variables are used in pattern definitions to store tokens from the text stream into re-usable variables).

User-defined actions are executed when a pattern is matched during an active ITM monitor session. Actions may also be executed at the start of a monitor session or every x seconds. Action definitions consist of one or more action calls with the appropriate action syntax. ITM variables may be used in action definitions (the value of the variable is substituted when the action is executed). Available actions are:
send information to an output stream (modem)
send information to a terminal display
execute UNIX commands
send lines of text stream to an output stream
begin recording text stream to a new output stream.
begin searching for another pattern
stop searching for a pattern
execute a macro (pre-defined list of patterns and actions)
begin execution of timed actions
end execution of timed actions
compare 2 tokens (at least one of which is an ITM variable)
keep track of the number of times a pattern is matched in an ITM variable
reset the ITM variable used to count the number of times a pattern is matched
pause an ITM session
end an ITM session The ITM system includes an editor, a method to activate and deactivate monitor sessions, and a help facility. The editor is used to generate session files, containing pattern and action definitions. Old session files may also be re-edited using ITMs editor. The editor also allows for multiple editing sessions, input from mouse or keyboard, and cut/copy/paste functions between session files. If the user does not wish to use UNIX metacharacters to define pattern definitions, the user may take advantage of the template format the editor provides for defining patterns. The template is created when the user selects, with the mouse, individual tokens in a pattern definition as important (Important tokens are tokens that should by matched with the corresponding tokens in the text stream). The selected tokens are either highlighted or marked with leading and trailing identifiers, i.e. <<PM180>>. All unselected words in the "template" are later converted to UNIX metacharacters by the AWK to English Translator.

Before an Interactive Text Monitor session can be activated, the user needs to identify the source to be monitored. If the text stream is originating from a modem connection, the user will need to make the modem connection. Once the connection is made, the user provides ITM with the session name and the filename of the text file (or port device name if the text stream is from an I/O device). Once this session is activated, a message window and a file are available for viewing output from the monitor session.

Deactivating the active session is accomplished by providing ITM with the name of the active session. If the user is using ITM to monitor a text stream from a modem port, the user is free to deactivate the session, keep the modem connection up, and activate another ITM session.

A help facility is provided for every editor function and during the activation and deactivation processes.

Figure 2:
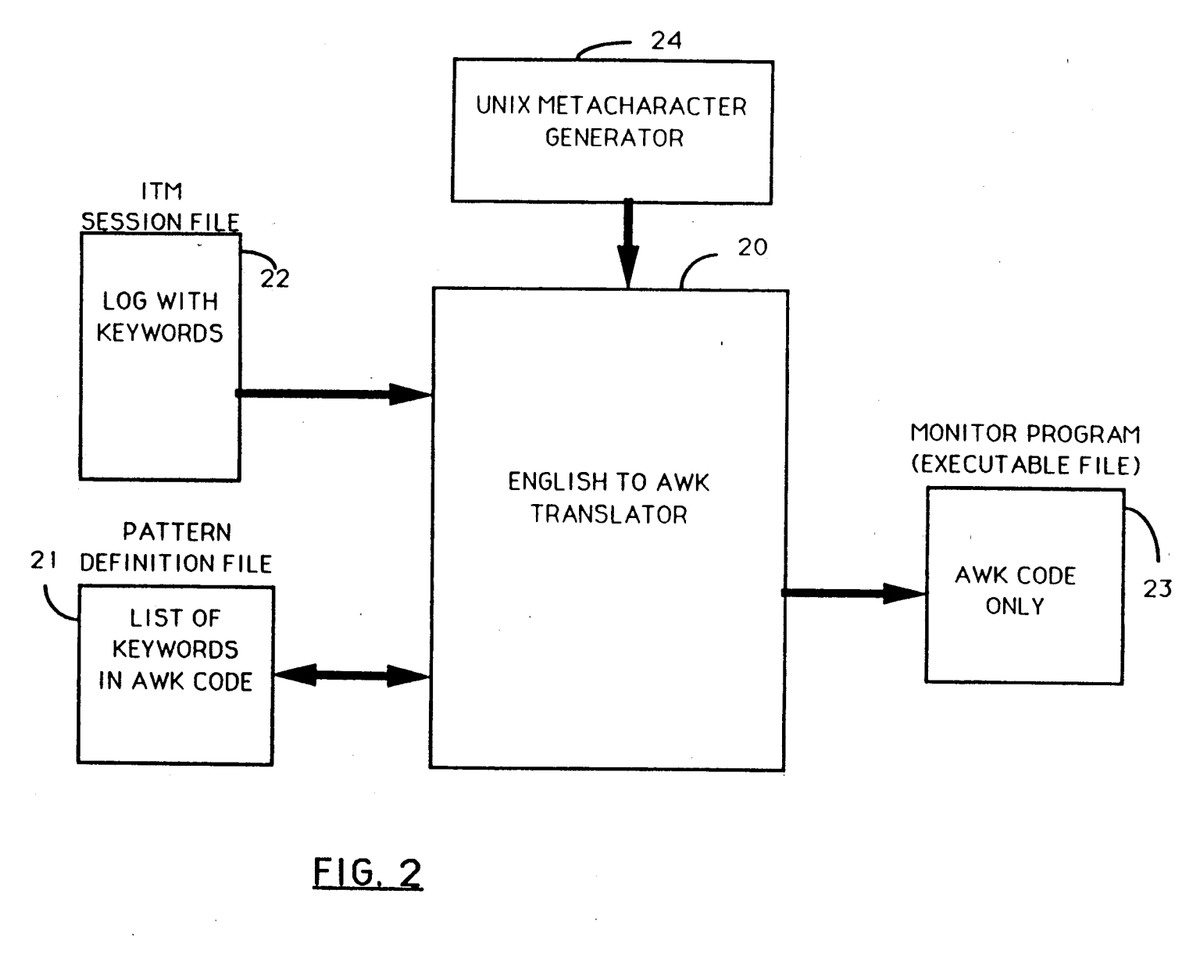
FIG. 2 is a block diagram describing graphically the process for generating a monitor program.

With reference to FIG. 2, the English to AWK Translator 20 is the underlying process that creates AWK code from English text in the Interactive Text Monitor system. The English text is made up of system-defined keywords and data kept in a pattern definition file 21 (pattern definitions, action definitions, comments, etc.). Most keywords identify to ITM the type of data, a pattern or action definition, that follows them. For example, the keyword INFORMATION TO TERMINAL DISPLAY identifies that the Translator should create AWK code so the information is displayed on the terminal when the action is executed. Other keywords identify a specific action, such as stopping a pattern search, that should be coded in the AWK program. The following are the 19 keywords and their respective syntax (keywords are in upper-case, parameters are in lower case):

BEGIN TIMED ACTIONS time_in_seconds
END TIMED ACTIONS <no parameters>
STOP TIMED ACTIONS timed_action_group_number
BEGIN PATTERN DEFINITION time_in_seconds_before_timing_out_search pattern_definition
END PATTERN DEFINITION <no parameters>
STOP PATTERN SEARCH <no parameters>
INFORMATION TO OUTPUT STREAM output_stream information
INFORMATION TO TERMINAL DISPLAY information
EXECUTE UNIX COMMANDS unix_commands
LINES TO OUTPUT STREAM output_stream lines_before_current lines_after_current
NEW RECORDING STREAM output_stream
EXECUTE A MACRO macro
BEGIN TOKEN COMPARE token_1 logical_operator token_2
END TOKEN COMPARE <no parameter>
COUNT TIMES PATTERN MATCHED ITMVARx
RESET PATTERN COUNTER ITMVARx
PAUSE ITM SESSION time_in_seconds
STOP ITM SESSION <no parameters>
%% comments An explanation of these keywords and corresponding AWK code is shown in Appendix A.

All the keywords and data in the English text are validated by ITM to ensure that they have proper syntax and form before storing them into the session file 22. The ITM editor provides full help on defining patterns and actions and the syntax for each.

The Translator 20 reads the session file line-by-line and creates, as its output, an executable AWK program 23. Keywords located in the session file 22 signal the Translator what conversion routines should be executed in order to create the AWK code. If a template format is used to define a pattern definition, the unmarked tokens in the pattern definition are replaced by UNIX metacharacters 24. During the Translator's pass of the session file, an analysis is made of how many dependent patterns exist, how many nested patterns exist for each dependent pattern, types of action calls that will need to be executed, etc. This analysis provides the Translator with the means for creating the AWK code.

The main goals of the invention are identified in detailed descriptions of (1) ITMs capabilities and (2) ITMs English to AWK Translator.

(1) Interactive Text Monitor Capabilities: ITMs pattern searching takes full advantage of the text processing power of UNIX and AWK. The following UNIX metacharacters can be used to define patterns:

| metacharacter | use: |
|---|---|
| | turns off any special meaning of a metacharacter |
| | matches the beginning of a line |
| s | matches the end of a line |

| metacharacter | use |
|---|---|
| . | matches any single character |
| [ ] | used to form character classes |
| ( ) | used for grouping |
| * | matches zero or one of the specified character |
| + | matches one or more of the specified character |
| ? | matches zero or one of the specified character |
| . | matches any line |
| .* | matches any field |

Following are examples for using the UNIX metacharacters:

| | |
|---|---|
| $ | matches the character $ |
| ^C | matches a C at the beginning of a line |
| C$ | matches a C at the end of a line |
| ... | matches any three consecutive characters |
| [ABC] | matches any of the characters A, B, or C |
| [A-Za-z] | matches any single letter |
| [^0-9] | matches any character except a digit |
| (AB) | matches A immediately followed by B |
| A* | matches zero or more A's |
| A+ | matches one or more A's |
| (AB)+C | matches ABC, ABABC, and so on |
| A? | matches the null string or A |
| AB*C | matches AC, ABC, or ABBC, and so on |
| AB+C | matches ABC, ABBC, or ABBBC, and so on |
| AB?C | matches AC or ABC |
| [A-Z]+ | matches any string of one more upper-case letters |

In addition to metacharacters, the user can define patterns using ITM variables. The syntax for ITM variables is "ITMVARx", where x is an integer 1 or higher. ITM variables can be intermixed with metacharacters and regular strings (regular strings contain 1 or more alphanumeric characters).

When a monitor session is activated and a pattern definition containing ITM variables is matched, the ITM variable will store the value of the matched token from the current line of the text stream. (Pattern definition taken from the session file) PM128 .* .* LGC ITMVAR1 UNIT ITMVAR2

RTPE * PM128 89/10/05 7362 LGC 2 UNIT 0
(Current line of the text stream)

The AWK code actually only searches for the predefined regular strings and metacharacters in the text stream. The ITM variables that were defined by the user are replaced by the UNIX metacharacter ".*" in the AWK code. When a match is found, the AWK code locates the position of the first regular string in the pattern definition with respect to the field number in the matched text stream. Given the location of the ITM variable with respect to the first regular string in the pattern definition, the AWK code retrieves the token from the text stream and stores the value in the ITM variable.

Regular string

/PM128 .* .* LGC .* UNIT .*/ (Pattern definition taken from the AWK program)

RTPE * PM128 89/10/05 7362 LGC 2 UNIT 0
(Current line of the text stream)

Since pattern definitions may be nested with other patterns, pattern definitions can be quite complex in structure. Nesting is accomplished by assigning state values for each pattern definition in the AWK program. In a pattern structure that contains nested pattern definitions, the first pattern (or independent pattern) has a state value that is always true (to allow the text stream to be matched against the pattern definition at all times), unless the user wishes to disable the pattern search by using the action "stop searching for a pattern". The nested pattern definitions have unique state variable names. Each variable's value in the nested pattern definitions is initially false. The value is set true when the preceding pattern definition is matched with the text stream. The value is set to false for the current pattern definition's state variable when that pattern definition is matched. This series of setting the state values true and false makes pattern definition nesting possible in the Interactive Text Monitor system.

The syntax for defining actions in the ITM editor varies from action to action. The basic format for an action definition consists of the action keyword followed by one or more strings on one or more lines. The exact syntax for each action is available, as a help, during the ITM edit session.

Actions that should be executed, when a pattern definition is matched, logically follow the pattern definition in the session file. Timed Actions are enclosed by "begin" and "end" keywords and can be located outside pattern definitions in the session file. Initial actions must be located at the front of the session file, before any pattern definitions or timed actions.

When actions are executed in the AWK code, the actions are either executed directly in AWK or processed by other programs running as background processes. Actions that only require direct manipulation of AWK variables or sending information to a file (such as token compares, counters, sending information to terminal displays, etc.) are executed in the AWK code. The other actions that cannot be executed in AWK, because of AWKs limitations, are processed by individual programs that run in background.

When these actions need to be executed by ITMs background processes, AWK sends a message request to 1 of 3 files: itm.display (for requests to display messages in the terminal display), itm.cutlines (for requests to send lines to an output stream or to begin recording in a new output stream), and itm.actions (for requests to execute UNIX commands, handle time requests, and pause the ITM session). Three programs run in the background and constantly watch (using the UNIX system utility, "tail -f") each of the 3 files for new requests. When a request is received by a background program, it is immediately executed and a reply is sent back to the AWK code, if necessary, when the action has been executed. The background program issues replies by appending messages to the text stream. The AWK code is structured so that it scans the text stream for these replies.

(2) English to AWK Translator: The English to AWK Translator converts the session file 22, created when the user defines patterns and actions in the definition file 21, using the ITM editor, into AWK by reading the file line-by-line and producing AWK code 23 based on the keywords found in the session file. Each keyword has an accompanying routine in the Translator program that is responsible for adding a section of AWK code to the AWK program.

The session file consists of pattern/action keywords, pattern definitions, and action definitions. ITM validates these session files when the user saves the file in the editor, insuring proper syntax and format in the file. After this automatic validation, the text file is translated into an executable AWK program. The AWK program has a structured format in the following order:
variable/constant declarations
initial action routines
status checking routines
timed actions
pattern and action definitions The AWK program assigns unique state variables to each pattern definition and timed action group. State variables are used to identify which pattern definition may be searched for at any time and which timed action group should be running. State variables, along with variables used for mathematical equations to calculate what lines to pull from the text stream, are declared in the variable/constant declarations section at the top of the AWK code. The AWK code for the variable/constant declarations section is:

```
awk
BEGIN       { indep[1..x] = 1
              timed[1..y] = 1
              stopsearch[1..z] = 0
              outstream.count = 0
              recstream.count = 0
              NR_temp = 0
```

(x = number of independent patterns in the AWK code, y = number of timed action groups in the code, and z = number of patterns that have the action stop pattern search in the AWK code)

Following the variable/constant declarations are the initial actions that may have been requested by the user. This section is also used for sending messages to the actions file to immediately start any timed action groups that exist in the AWK code. The following AWK code is generated when the initial actions are to send information to the terminal display and the output stream and one timed action group is present in the session file:

```
printf "information n" >> "output_stream"
printf "information n" >>
    "~/session_name.itm.display"
printf "timerequest 0 timed1 n">>
    "~/session_name.itm.actions"
}
```

The status checking routines come after the initial actions. Status checking routines are set up to aid in status checks (either automatic by the ITM or individual requests for system status checks by the user). These status checking routines appear in the AWK code as independent pattern and action pairs, where each pair searches for a system defined string and sends a message to the terminal display indicating the success of the check if a match was found. The AWK code for this section is:

```
/CHECK ITM/ {
printf "ITM is running fine. n" >>
    "~/session_name.itm.display"
}
```

Timed actions follow the status checking routines. Even though the timed actions may have been entered in different areas of the session file, the Translator processes the timed actions after the initial actions and places them before any pattern or action definitions. There is no limit on the number of timed action groups that can be present in this section of the AWK code. An example of the AWK code for the timed action section follows:

```
/timed1/ { if (timed[1] == 1)
{
printf "Timed Action Group running again. n"
    >> "~/session_name.itm.display"
printf "timerequest 60 timed1 n"
    >> "~/session_name.itm.actions"
}
}
```

The final section in the AWK code is the pattern and action definitions. The user can have any combination of these actions and patterns in the AWK code. The AWK code ends after the pattern and action definitions. An example of AWK code for an independent pattern with 1 action follows:

```
/pattern_definition/ { if (indep[1] == 1)
{
printf "information n" >>
    "~/session_name.itm.display"
}
} exit
```

We can take as an example of the following pattern which generates the AWK code required to search for a PM 128:

```
INDEPENDENT PATTERN DEFINITION
STANDARD EDIT MODE
<<RTPC    ** PM128 JAN30 09:24:48 TBL ISTB TMS 0 >>
             Node : ISTb (Inact 00S, CSLink 00S)
<<           Unit0 Inact: SysB (Swacting) >>
             Unit1 Act: InSv
         INFORMATION TO TERMINAL DISPLAY
         PM 128 HAS BEEN MATCHED
awk
BEGIN    { state = 1
           NR_temp = 0
           NL_count = 0
           CL_count = 0
           count = 0
           pager = "dms.actions.pager"
           cutlog = "dms.actions.cutlog"
           newlog = "dms.actions.newlog"
           dmsoff = "dms.actions.dmsoff"
           unix = "dms.actions.unix"
           keyword = "DMS.SCAN.ACTION"
           keyword2 = "cutlos"
         }
```

```
            { count = count - 1 }
            { print $0 >> "/users/mallen/session.temp.log" }
            { if (count%5 == 0) {
                printf "audit  n" >> "/users/mallen/audit.check1"
              }
            }
/CHECK MONITOR/ {
printf "monitor is running fine.  n" >>
"/users/mallen/logmon.messages"
            }
/LM AUDIT/      {
printf "audit passed  n" >> "/users/mallen/audit.check2"
            }
/RTPC  *  * PM128 JAN30 09 :24 :48 9000 TBL ISTB TMS 0 /
{ if (state == 1)
    {
      fm = 0
    line[11] = NR
    nestline[11] = 1
    }
}
{ if(nestline[11] == 1)&&(NR-line[11] > 5))
    {
    nestline[11] = 0
    }
}
/          .*        .*.*.*.*.* / { if (nestline[11] == 1)
    {
      fm = 0
    line[12] = NR
    nestline[12] = 1
    nestline[11]= 0
    }
}
{ if((nestline[12] == 1)&&(NR-line[12] > 5))
    {
    nestline[12] = 0
    }
}
/      UNITO INACT : SYSB  (SWACTING ) / { if
        (nestline[12] == 1)
    {
      fm = 0
    line[13] = NR
    nestline[13] = 1
    nestline[12]= 0
    }
}
{ if ((nestline[13] == 1)&&(NR-line[13] > 5 ))
    {
    nestline[13] = 0
    }
}
/        .*      .* .* / { if (nestline[13] == 1)
    {
      fm = 0
      printf "PM 128 HAS BEEN MATCHED  n" >>
        "/users/mallen/logmon.messages"
      printf "  n" >> "/users/mallen/logmon.messages"
    nestline[13] = 0
        state = 1
       }
     }
,
exit
```

APPENDIX A

Following are explanations of the 19 keywords and the AWK code each produces:

(1) BEGIN TIMED ACTIONS: Indicating to begin a timed action group in the ITM editor, the user also must specify the time in seconds that should elapse between each execution of the timed actions. In the editor, the user can declare one or more actions to be executed for each timed action group. Each group is uniquely timed, so one or more groups can be executing at the same time. The AWK code for this keyword is:

```
/timed1/ { if (timed[1] == 1)
    {
```

(2) END TIMED ACTIONS: End timed actions represents the end of the timed action group. This keyword produces AWK code that sends a request for ITM to count x seconds (for the timed action group pause) and send a reply when the time has elapsed. The AWK code for this keyword is:

```
    printf "timerequest time_in_secs timed1
        n" >> "~/session_name.itm.actions"
    }
}
```

(3) STOP TIMED ACTIONS: Stop timed actions sends a signal to ITM to end the timed action group. The user enters the timed action group number following the keyword. The number ranges from 1 to the number of timed action groups present in the session file. (Timed action group 1 is the first timed action group found in the session file). The AWK code for this keyword is:

```
            timed[1] = 0
```

(4) BEGIN PATTERN DEFINITION: The user details the pattern definition below the keyword. The pattern definition may consist of 1 or more tokens on 1 or more lines. Metacharacters and ITM variables may be used to describe the pattern. The AWK code for pattern definitions can be complex when pattern definitions are nested within other pattern definitions. Only 5 examples of AWK code for pattern definitions are presented:

```
Case 1: Independent pattern definition
        with only 1 line in the definition.
    /pattern_definition/ { if (indep[1] == 1)
        {
Case 2: Independent pattern definition
        with 2 lines in the definition.
    /1st_line_of_def/ { if (indep[2] == 1)
        {
        line[21] = NR
        nestline[21] = 1
        }
    }
%% The following code sets the state
%% variable of the second line of the
%% pattern definition to false if the
%% second line is not matched in
%% the next 5 lines of the text stream.
    { if ((nestline[21] == 1) && (NR-line[21]>
        5))
        {
        nestline[21] = 0
        }
    }
    /2nd_line_of_def/ { if nestline[21] ==
        1)
        {
Case 3: Independent and nested pattern
        definition, each with only 1 line in
        the pattern definition.
    /indep_pattern_def/ { if (indep[3] == 1)
        {
        nested[41] = 1
        printf "timerequest time_in_secs
            nested41  n" >>
```

-continued

```
            "~/session_name.itm.actions"
        }
    }
%% The following code sets the state
%% variable of the nested pattern
%% definition to false if the nested
%% pattern is not matched before the
%% before the timer runs for the search.
/nested41/ { if (nested[31] == 0)
    {
    nested[41] = 0
    }
}
/nested_pattern_def/ { if (nested[41]
    == 1)
    {
Case 4: Independent pattern definition with
    only 1 line in the definition and
    the action to stop the pattern
    search following it.
/pattern_definition/ { if (indep[1] == 1)
    && (stopsearch[1] == 0)
    {
    stopsearch[1] = 1
Case 5: Independent pattern definition with
    only 1 line in the definition and an
    ITM variable in the pattern
    definition.
/pat_def_a ITMVAR1 pat_def_b/ { if
    (indep[1] == 1)
    {
    pos = 0
%% Locate the position (pos) of the
%% first regular string of the pattern
%% definition (pat_def_a) and
%% subtract 1 from it when it is
%% found.
    for ( pos = 1; pos < NF; pos++)
        if ($pos == pat_def_a)
        {
        pos = pos - 1
        break
        }
    ITMVAR1 = $(2 + pos)
```

(5) END PATTERN DEFINITION: End pattern definition represents the end of the pattern definition. This keyword produces AWK code that closes the pattern definition. Appropriate state variables are set false before closing the definition. The AWK code for the 5 examples described in the previous section follows:

```
Case 1: Independent pattern definition with
    only 1 ine in the definition.
    }
}
Case 2: Independent pattern definition with
    2 lines in the definition.
    nestline[21] = 0
    }
}
Case 3: Independent and nested pattern
    definition, each with only 1 line in
    the pattern definition.
    nested[41] = 0
    }
}
Case 4: Independent pattern definition with
    only 1 line in the definition and
    the action to stop the pattern
    search following it.
    }
}
Case 5: Independent pattern definition with
    only 1 line in the definition and an
    ITM variable in the pattern
    definition.
```

-continued

```
    }
}
```

(6) STOP PATTERN SEARCH: This keyboard with no parameters indicates that the current pattern should never be searched for again. In the following AWK code, the stop searching variable is set true:

```
stopsearch[x] = 1
```

(7) INFORMATION TO OUTPUT STREAM: The user specifies the filename of the output stream and the information to send to it in the ITM editor. In UNIX, port devices are treated in the same manner as regular files, so it is possible to express that information be sent to a port (useful when trying to send commands across a modem link to a remote switch automatically). The AWK code sends the information to the specified output stream every time the action is executed. The AWK code for this keyword is:

```
printf "information n" >> "output_stream"
```

(8) INFORMATION TO TERMINAL DISPLAY: The user specifies the information to be sent to the terminal display. When the action executes, the AWK program will send the information to a message file (the information is appended to the end of the file). The Interactive Text Monitor displays a window with the contents of the message file during an active monitor session. If the user does not have access to windowing, the message file can be viewed using a UNIX editor such as VI. The AWK code for this keyword is:

```
printf "information n" >>
    "~/session_name.itm.display"
```

(9) EXECUTE UNIX COMMANDS: In the editor, the user specifies the commands that should be executed in UNIX. When the action is executed, the AWK code sends the action request to the actions file, itm.actions. The background process that reads itm.actions retrieves the action request from the file and executes the command in UNIX. The AWK code for this keyword is:

```
printf "unixcmd information n" >>
    ~/session_name.itm.actions"
```

(10) LINES TO OUTPUT STREAM: The user specifies the number of lines to print before and after the current line of the text stream and the filename of the output destination. At execution, the system sends an action request to the cutlines file. A background process executes the requests in the cutlines file at the end of the active monitor session by creating a temporary AWK program that, when executed with the text stream serving as the input, pulls the requested lines from the text stream an places them in the filename chosen by the user. Each time this action executes, the filename is appended with a counter increment of 1 (Otherwise, the files would be over-written at each execution of the action). The AWK program that pulls requested lines from the text stream looks like:

```
awk '
  NR > top_value && NR <= bottom_value
```

The AWK code for this keyword is:

```
outstream.count += 1
outputstream =
    output_stream.outstream.count
top = NR - lines_before_current
bottom = NR + lines_after_current
printf "cutlines %s %d %d n",outputstream,
    top, bottom >>
    "~/session_name.itm.cutlines"
```

(11) NEW RECORDING STREAM: The user enters a filename where the text stream should be recorded. When this action is invoked, the AWK program issues an action request to the cutlines file. The same background process that retrieved requests from the cutlines file for the previous action, lines to output stream, retrieves this action's requests at the end of the active monitor session and creates a temporary AWK program to pull the text stream and place it in the specified file (Similar to the previous action, each time this action executes, the filename is appended with a counter increment of 1). The AWK code for this keyword is:

```
recstream.count += 1
recordstream =
    output_stream.recstream.count
top = NR_temp
bottom = NR
NR_temp = NR + 1
printf "recstream %s %d %d n",
    recordstream, top, bottom
    >> "~/session_name.itm.cutlines"
```

(12) EXECUTE A MACRO: Macros are pre-defined lists of patterns and action definitions. A macro is a subset of a complete session file. Macros are created using the ITM editor and validated for syntax and format when the user closes the macro file. The user enters the macro name in the session file where the contents of the macro are to be executed. When the session file is translated to AWK, the text in the macro is inserted into the session file and translated along with it. The patterns and definitions in the macro are translated as if they were part of the original session file.

(13) BEGIN TOKEN COMPARE: The user specifies the two tokens to compare and the logical operator to compare the tokens with in the editor. One or more of the tokens must be an ITM variable that contains a value. When the action is executed, the AWK code compares the 2 token strings and executes any actions that follow it. If the comparison is false, the actions that follow the comparison are not executed. The AWK code for this keyword is:

```
if (token_1 logical_operator token_2)
{
```

(14) END TOKEN COMPARE: This keyword represents the end of a token compare group. Any actions that fall after the BEGIN TOKEN COMPARE keyword and this keyword are executed if the token comparison is true. The AWK code for this keyword is:

```
}
```

(15) COUNT TIMES PATTERN MATCHED: The user specifies an ITM variable name that is used to store the number of times a pattern is matched. The AWK code will increment the ITM variable each time the pattern is matched. The AWK code for this keyword is:

```
ITMVARx = ITMVARx + 1
```

(16) RESET PATTERN COUNTER: The user specifies an ITM variable name that represents a counter for pattern matches. This variable is reset to 0 when this action executes. The AWK code for this keyword is:

```
ITMVARx = 0
```

(17) PAUSE ITM SESSION: The user specifies the time in seconds to pause the ITM session. When this action executes, the AWK code sends a request message to the actions file. The background process that is executing these requests halts the flow of text stream to the AWK program for the specified number of seconds. The AWK code for this keyword is:

```
printf "pauserequest time_in_secs n"
    >> "~/session_name.itm.actions"
```

(18) STOP ITM SESSION: This keyword without any parameters is used to stop the entire ITM session. This action makes the AWK program exit immediately. The code for this keyword is:

```
exit
```

(19) %%: This keyword is used to identify a comment in a session file. A comment must be on an individual line that does not contain any keywords, pattern, or action definitions. The keyword and its comment are not translated into AWK code.

We claim:

1. A method of creating a monitor program for monitoring text streams contained in log reports produced by a telephone switch, comprising the steps of:
    selecting text strings with individual character patterns required to be matched with corresponding character patterns in text streams contained in the log reports;
    creating a pattern definition according to the selected text strings;
    storing said pattern definition in a session file;
    selecting action definitions and corresponding action keywords such tat the selected action is executed when a pattern definition is matched;

reading the session file containing the pattern definition;
associating each keyword with a corresponding software code; and
listing the corresponding software codes for each keyword to create the monitor program.

2. A method as defined in claim 1, wherein said monitor program is executed by:
activating said monitor program;
receiving text strings from I/O means connected to said telephone switch;
reading the text strings;
sending action commands to an action file when a match is found in said text strings;
reading the action requests from the action file;
performing the action requests; and
deactivating the monitor program.

3. A method as defined in claim 2, wherein said text strings are stored into a text file once they are received.

4. A method as defined in claim 3, wherein said action commands are sent to an action file when a match is found in said text file.

5. A method as defined in claim 1, further comprising the step of:
converting unselected characters in said pattern definition to UNIX metacharacters.

6. A method as defined in claim 1, wherein said corresponding software code is an AWK code.

* * * * *